UNITED STATES PATENT OFFICE 2,040,368

AZO-DYESTUFFS CONTAINING CHROMIUM AND PROCESS OF PREPARING THEM

Erich Fischer, Bad Soden-on-the-Taunus, Germany, assignor to General Aniline Works, Inc., New York, N. Y., a corporation of Delaware No Drawing. Application July 16, 1935, Serial No. 31,733. In Germany July 21, 1934

10 Claims. (Cl. 260—12)

The present invention relates to new azo-dyestuffs containing chromium. It comprises the process of making these chromed dyestuffs, the chromium compounds of the dyestuffs and the material dyed with the new products.

Now, I have found, that very valuable azo-dyestuffs containing chromium are obtainable by transforming a pyrazolone-azo-dyestuff of the following general formula:

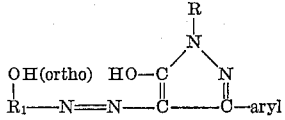

wherein R represents hydrogen or an aryl radical and $R_1$ stands for a radical of the benzene or naphthalene series, into its chromium complex compound by treating it in substance according to known methods with an agent yielding chromium.

The starting materials used according to the present invention are obtainable by coupling a diazotized ortho-aminophenol or ortho-aminonaphthol or a substitution product thereof with a 3-aryl-5-pyrazolone or a 1,3-diaryl-5-pyrazolone.

As agents yielding chromium with which the azo-dyestuffs of the above general formula are to be treated, there may be used inorganic chromium salts, such as, for instance, chromium fluoride, chromium sulphate, chromium chloride, as well as organic chromium salts, such as, for instance, chromium acetate or chromium formate. The agents yielding chromium may be applied in an acid, neutral or alkaline medium, with or without suitable additions, either in an open vessel or under raised pressure.

The chromiferous azo-dyestuffs obtainable by the present invention dye, for instance, wool orange to Bordeaux tints which are distinguished by very good properties of fastness, especially by a very good fastness to washing, fulling and light. As regards the fastness to washing and fulling they surpass the known chromium containing azo-dyestuffs from ortho-hydroxy-diazo-compounds and 5-pyrazolone-3-carboxylic acid or 5-pyrazolone-3-carboxylic acid esters, 3-methyl-5-pyrazolone, 1-aryl-3-methyl-5-pyrazolones or 1-aryl-5-pyrazolone-3-carboxylic acids.

The following examples illustrate the invention but they are not intended to limit it thereto; the parts are by weight.

(1) 585 parts of the azo-dyestuff obtainable from diazotized 4-chloro-2-aminophenol-6-sulfonic acid and 1-(2'-chloro-5'-sulfophenyl)-3-phenyl-5-pyrazolone, in an aqueous solution are mixed with chromium formate corresponding with 70 parts of chromium oxide and the whole is boiled under reflux for several hours. The chromium complex compound, thus formed, of the dyestuff is salted out, filtered by suction and dried. It is a red powder and dyes wool, when applied by the dyeing method usually applied to dyestuffs containing chromium, red tints which, besides a good fastness to light, especially possess a very good fastness to washing and to fulling.

(2) 495 parts of the azo-dyestuff obtainable from diazotized 6-nitro-2-amino-4-methyl-1-hydroxybenzene and 1-(2'-sulfophenyl)-3-phenyl-5-pyrazolone, in an aqueous solution are mixed with 120 parts of chromium fluoride and the whole is heated to boiling in a reflux apparatus for several hours. The dyestuffs obtained is salted out by means of sodium chloride. It is worked up in the usual manner and then is a red powder. The bluish-red dyeings obtained with this chromium compound are distinguished by a good fastness to light, to washing and to fulling and a very good evenness.

(3) By substituting for the dyestuff mentioned in Example 1, 58 parts of the azo-dyestuff obtainable from diazotized 1-amino-2-naphthol-4-sulfonic acid and 1-(4'-methyl-2'-sulfo-phenyl)-3-phenyl-5-pyrazolone, there is obtained under analogous working conditions the chromium complex compound of this dyestuff which is worked up as usual and dried; it is a red powder which yields in a strongly acid dye-bath clear, very bluish-red dyeings of an essentially more bluish hue than those of the dyestuffs described in Examples 1 and 2. The dyeing is distinguished by a good fastness to light, to washing and to fulling.

(4) By using in Example 2, 505 parts of the azo-dyestuff from diazotized 4-chloro-2-amino-1-hydroxybenzene-6-sulfonic acid and 1-(2'-chlorophenyl)-3-phenyl-5-pyrazolone, there is obtained, by working up in an analogous manner, the chromium compound of the dyestuff which dyes wool in red tints of good fastness to light, washing and fulling.

(5) 505 parts of the azo dyestuff from diazotized 6-chloro-2-amino-1-hydroxybenzene-4-sulfonic acid and 1-(4'-chlorophenyl)-3-phenyl-5-pyrazolone are dissolved in 7000 parts of water. There is added an aqueous solution of 120 parts of chromium fluoride and the whole is heated to boiling in a reflux apparatus for 10 hours. From the clear solution the chromium compound of the dyestuff is precipitated by means of sodium chloride. It is dried after being filtered with suction and forms a red powder which dyes wool yellowish-red tints which are fast to washing and to fulling.

The method of chroming described in the foregoing examples may be largely varied as indicated in the specification. Thus other chromium salts may be used; raised pressure and elevated temperature may be applied or the like.

Instead of the dyestuffs which in the foregoing examples are subjected to the chroming process, other pyrazolone-azo-dyestuffs which are comprised by the above general formula may be used, for instance, the dyestuffs which are obtainable by coupling the diazo compound of any ortho-aminophenol or ortho-aminonaphthol or its substitution products such as ortho-aminophenol, 4-chloro-2- aminophenol, 4,6- dichloro -2- aminophenol, 6- nitro-2- aminophenol-4- sulfonic acid, 4-nitro-2-aminophenol-6-sulfonic acid, 5-nitro-2-aminophenol, 5-nitro-4-chloro-2-aminophenol, 6- chloro -4- nitro -2- aminophenol, 6- nitro -4-chloro-2-aminophenol, 4,6-dinitro-2-aminophenol, with, for instance, 1-(4'-chloro-2'-sulfophenyl)-3-phenyl-5-pyrazolone, 1-(2',4'-dichloro-6'-sulfophenyl)-3-phenyl-5-pyrazolone, 1-(3'-sulfaminophenyl)-3-phenyl-5-pyrazolone, 1-(4'-sulfo-alpha-naphthyl)-3-phenyl-5-pyrazolone, 1-(2'-hydroxy-3'-carboxy-5'-sulfophenyl)-3-phenyl-5-pyrazolone, 3-phenyl-5-pyrazolone, 1-(4'-sulfophenyl)-3-phenyl-5-pyrazolone, 1-(3'-sulfophenyl)-3-phenyl-5- pyrazolone, 1-(2'- methyl-5'-sulfophenyl)-3-phenyl-5-pyrazolone, 1-(2',4'-dimethyl-6'-sulfophenyl)-3-phenyl-5-pyrazolone, 1- phenyl-3- phenyl-5- pyrazolone, 1-(2'-bromophenyl)-3-phenyl-5-pyrazolone, 1-(2'-methoxyphenyl)-3-phenyl-5-pyrazolone, 1-(2',5'-disulfophenyl)-3-phenyl-5-pyrazolone, 3-(4'-chlorophenyl)-5-pyrazolone, 3-(4'-methoxyphenyl)-5-pyrazolone, 3-(alpha-naphthyl)-5-pyrazolone, 3-(4'-carboxyphenyl)-5-pyrazolone, 1-(2'-chloro-5'-sulfophenyl)-3-(4''-methylphenyl)-5-pyrazolone, 1-(3'-sulfophenyl)-3-(beta - naphthyl)-5-pyrazolone, 1-(4'- phenoxy -3'- sulfophenyl)-3-phenyl-5- pyrazolone, 1-phenyl -3-(4'- carboxyphenyl)-5- pyrazolone, 1-(2'-hydroxy-3'-carboxy-5'- sulfophenyl)-3-(4''-chlorophenyl)-5- pyrazolone, 1-(1'-sulfo-2'-naphthyl)-3-phenyl-5-pyrazolone.

The chromium compounds obtained yield orange to Bordeaux dyeings of properties which are similar to those mentioned in the foregoing examples.

I claim:

1. The process of preparing azo-dyestuffs containing chromium which comprises heating with agents yielding chromium, pyrazolone-azo-dyestuffs of the following general formula:

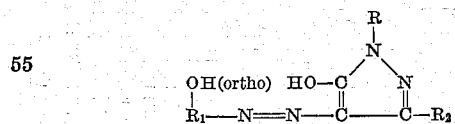

wherein R represents hydrogen or a radical of the benzene or naphthalene series and R₁ and R₂ stand for radicals of the benzene or naphthalene series.

2. The process of preparing azo-dyestuffs containing chromium which comprises heating with agents yielding chromium, pyrazolone-azo-dyestuffs of the following general formula:

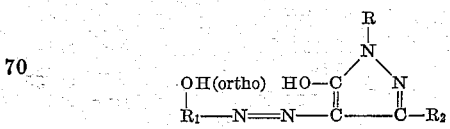

wherein R, R₁ and R₂ stand for radicals of the benzene series.

3. The process of preparing an azo-dyestuff containing chromium which comprises heating with an agent yielding chromium, a pyrazolone-azo-dyestuff of the following formula:

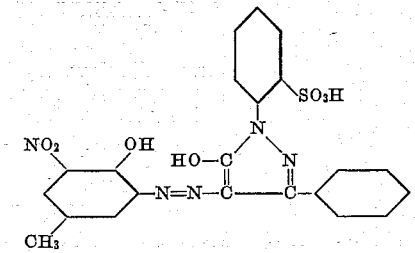

4. The process of preparing an azo-dyestuff containing chromium which comprises heating with an agent yielding chromium, a pyrazolone-azo-dyestuff of the following formula:

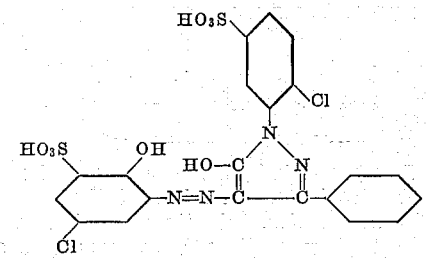

5. The process of preparing an azo-dyestuff containing chromium which comprises heating with an agent yielding chromium, a pyrazolone-azo-dyestuff of the following formula:

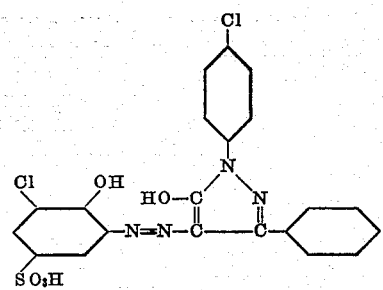

6. The chromium compounds of the azo-dyestuffs of the following general formula:

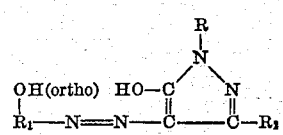

wherein R represents hydrogen or a radical of the benzene or naphthalene series, R₁ and R₂ stand for radicals of the benzene or naphthalene series and wherein the hydroxy group of the radical R₁ standing in ortho-position to the azo-bridge, in combination with this azo-bridge, contains bound chromium, which products form red powders which dye the animal fiber orange to Bordeaux tints of good fastness properties.

7. The chromium compounds of the azo-dye-stuffs of the following general formula:

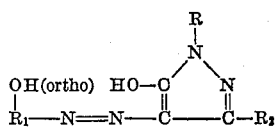

wherein R, R₁ and R₂ stand for radicals of the benzene series and wherein the hydroxy group of the radical R₁ standing in ortho-position to the azo-bridge, in combination with this azo-bridge, contains bound chromium, which products form red powders which dye the animal fiber orange to Bordeaux tints of good fastness properties.

8. The chromium compound of the azo-dyestuff of the formula:

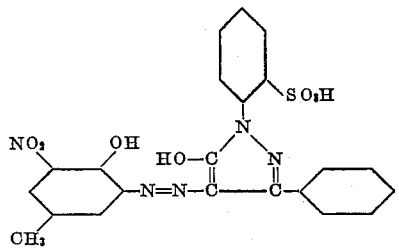

wherein the hydroxy group, in combination with the azo-bridge, contains bound chromium, which product forms a red powder dyeing the animal fiber bluish-red tints of good fastness to light, to washing and to fulling and very good evenness.

9. The chromium compound of the azo-dyestuff of the formula:

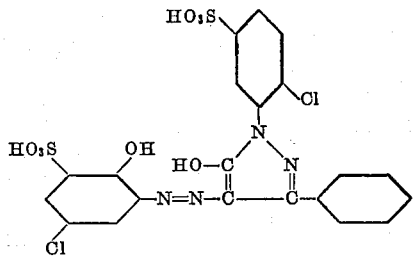

wherein the hydroxy group, in combination with the azo-bridge, contains bound chromium, which product forms a red powder dyeing the animal fiber red tints of very good fastness to washing and to fulling and good fastness to light.

10. The chromium compound of the azo-dyestuff of the formula:

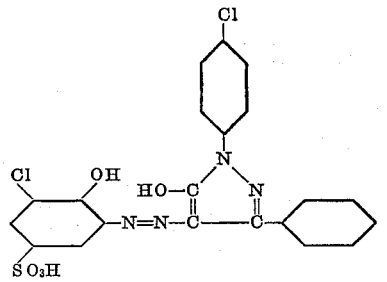

wherein the hydroxy group, in combination with the azo-bridge, contains bound chromium, which product forms a red powder dyeing the animal fiber yellowish-red tints of very good fastness to washing and to fulling.

ERICH FISCHER.